Figure 1:
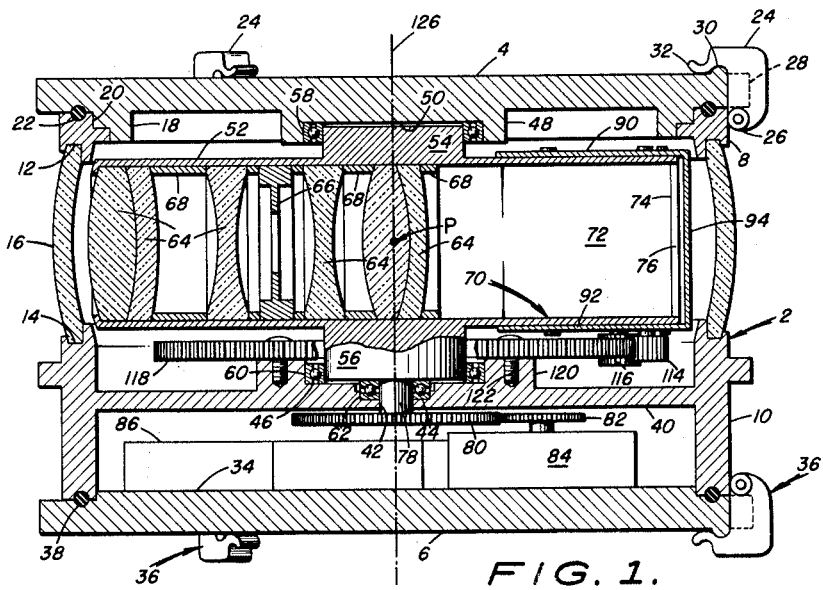

July 21, 1964

G. T. McNEIL 3,141,397

UNDERWATER 360° PANORAMIC CAMERA

Filed Oct. 19, 1962

2 Sheets-Sheet 1

GOMER T. McNEIL
INVENTOR

BY Walter S. Paul,
ATTORNEY

July 21, 1964 G. T. McNEIL 3,141,397
UNDERWATER 360° PANORAMIC CAMERA
Filed Oct. 19, 1962 2 Sheets-Sheet 2

GOMER T. McNEIL
INVENTOR

BY Walter S. Pawl.
ATTORNEY

United States Patent Office

3,141,397
Patented July 21, 1964

3,141,397
UNDERWATER 360° PANORAMIC CAMERA
Gomer T. McNeil, Bethesda, Md., assignor to Photogrammetry, Inc., Rockville, Md., a corporation of Delaware
Filed Oct. 19, 1962, Ser. No. 231,672
13 Claims. (Cl. 95—15)

This invention relates generally to wide-angle or panoramic cameras, and more particularly to an improved panoramic camera particularly adapted for underwater use and capable of photographing a full 360 degree field with substantially no image movement resulting from eccentricities of image and object space perspective centers relative to the axis of rotation of the camera lens system.

The desire for obtaining photographic records of panoramic scenes has spurred the development of numerous cameras for this purpose. Recently, a panoramic camera was developed that is capable of producing a highly resolved and dimensionally precise photographic record of a horizontal panoramic view from a ground exposure station. This camera obtains a panoramic effect by the common expedient of rotating its optical or lens system. The smear-causing image movements that normally occur in a rotating lens system because one or both of the nodal points of the system are displaced from the axis of rotation are eliminated therein by utilizing properly placed reflecting surfaces in a folded optical system, which surfaces make both nodal points appear to fall on said axis. While the folded optical system camera just described has proved of substantial value for normal ground operation, the requirements and characteristics of the underwater environment for which the present invention is intended render it less satisfactory than is desirable for such use.

A camera intended for underwater use should utilize an optical or lens system designed to satisfy the peculiar characteristics of the medium in which it is immersed. For example, the normal turbidity, light absorption, and light shattering present under water, make desirable a lens system having as short an object distance as is practicable. Further, because in underwater use relative motion is commonly present between the photographer and the object, use of range finders is difficult; hence, the optical system should have a fixed focus.

The camera of the present invention incorporates a fixed focus, in-line lens system especially constructed to satisfy the conditions present in an underwater environment. In addition, the optical or lens system of the present invention is so designed that substantially no image movement resulting from nodal separation occurs upon rotation thereof. Thus, the camera of the invention is capable of producing an unsmeared, dimensionally precise underwater photographic record.

The camera of the subject invention is constructed so that its lens system may be rotated through a full 360 degrees, with the position of the film relative to said system being precisely determined. Thus, a camera is provided which is capable of producing a complete panoramic view with a high degree of dimensional precision.

Because the camera of the invention is intended for underwater use, provision must be made to render it water tight to protect the interior thereof from damage. However, the water tight construction thereof should permit ready access to the camera mechanism for changing film and the like.

The subject camera is constructed to be water tight, but may be easily disassembled and subsequently reassembled to obtain access to the interior thereof. Thus, the camera provides for simplicity of operation under adverse conditions.

It is an object of this invention to provide a fixed focus camera having a capability to take photographs covering any part or all of a 360 degree panoramic view, and with any amount of overlap at the ends of the photographs, as may be desired.

Another object of the subject invention is to provide a fixed focus, in-line lens system for a panoramic camera, so constructed and arranged that substantially no image movement resulting from nodal point effects will occur in the focal plane when a portion of said lens system is rotated about an axis perpendicular to the principal axis thereof.

A further object of the present invention is to provide a panoramic camera constructed for use underwater, and which may be easily assembled and disassembled.

It is also an object of this invention to provide a film holding and transporting apparatus for a rotating lens-type panoramic camera, so constructed that film is precisely moved past the focal plane end of the rotating lens in a direction opposite to the direction of movement of said end.

Figure 2:
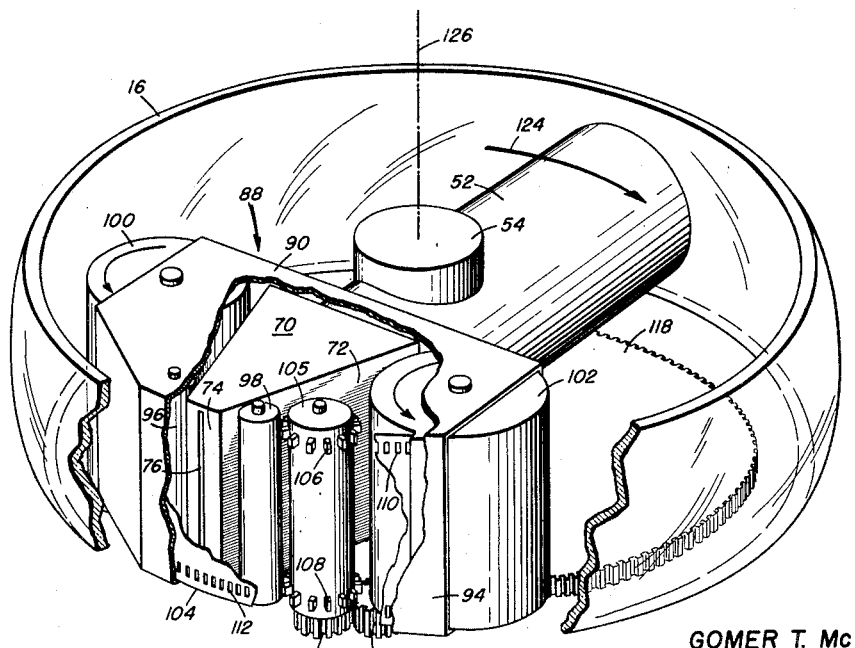
Figure 3:
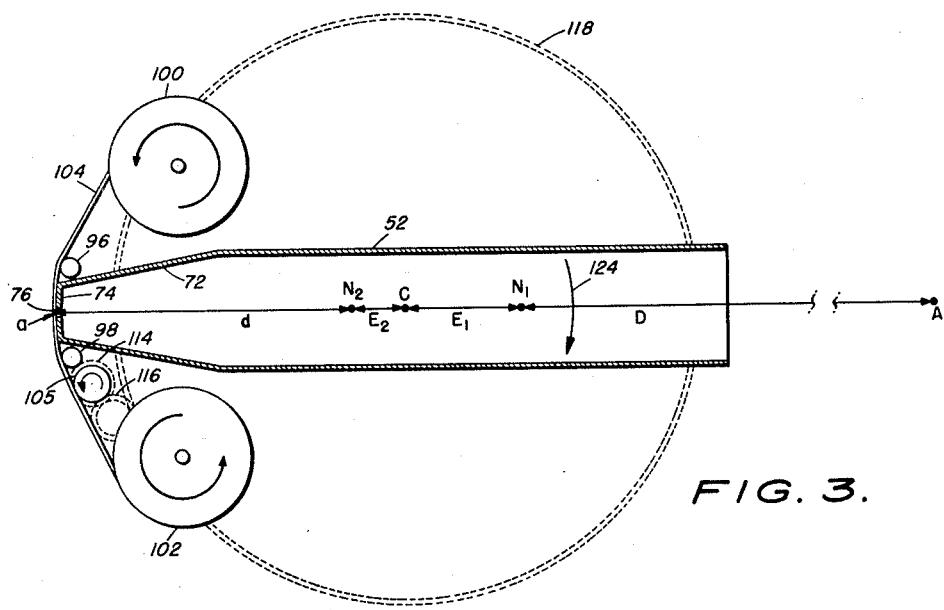
Figure 4:
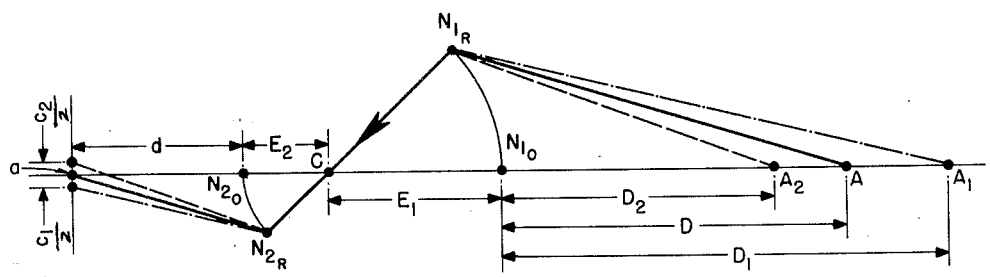

Other objects and many of the attendant advantages of the invention will be readily appreciated as the same becomes better understood by reference to the following detailed description when considered in connection with the accompanying drawings, wherein:

FIG. 1 is a schematic section through the camera of the invention, showing in particular the construction of the lens system and the manner in which it is mounted, FIG. 2 is a schematic view in perspective of the lens system and the film holding and transporting apparatus of the invention, FIG. 3 is a diagrammatic view of camera of FIG. 1, showing in particular the optical characteristics of the lens system thereof; and FIG. 4 is a diagram showing the optical geometry of the rotating lens system of the invention.

The panoramic camera of the invention comprises a water-tight cylindrical housing having a concentric lens mounted in the cylindrical wall thereof. The concentric lens is one component of the lens system of the camera, the remainder of said system comprising a plurality of lens elements mounted in an in-line manner within a lens barrel. The lens barrel is mounted for rotation within the cylindrical housing about an axis perpendicular to the principal axis of said barrel, and has a film holder attached to the rear end thereof. The shutter for the camera comprises a narrow vertical slit at the rear, focal plane end of the lens barrel, and the film holder is so geared to the housing that film will move relatively past said slit in a direction opposite to the direction of rotation of the lens system.

The lens system of the invention, as has been stated, has a fixed focus. The axis of rotation of the lens system is positioned relative to the front and rear nodal points of said system such that rays emanating from objects spaced from the camera further or closer than the fixed object distance of said system will not cause significant image movement over the narrow focal plane defined by the shutter slit. Thus, panoramic photographs may be taken by rotating the lens system, and no significant smearing of the image will occur.

Referring now to the drawings, a camera constructed according to the invention is shown schematically in FIG. 1, and includes a cylindrical housing 2 closed at its ends by top and bottom cover plates 4 and 6, respectively. The housing 2 comprises an upper cylindrical member 8 and a lower cylindrical member 10, said members 8 and 10 being spaced and having annular grooves 12 and 14, respectively, in their confronting end faces.

An annular, concentric lens element 16 is positioned between the cylindrical members 8 and 10 of the housing 2, and has its upper and lower edges disposed within the annular grooves 12 and 14, respectively. The lens element 16 has its two curved surfaces formed concentrically about a point P positioned at the intersection of the principal axis of the lens system with the axis of rotation thereof, and constitutes the front element of the camera lens system. The members 8 and 10 are secured in a watertight manner to the lens element 16 by the use of a suitable cement or adhesive between the edges of the lens and the walls of the grooves 12 and 14, thus forming the cylindrical housing 2.

The top cover plate 4 has a stepped annular rim 18 thereon positioned radially inwardly of the outer edge thereof, and which is telescopically received within a similarly shaped stepped annular socket 20 in the annular member 8. An annular, resilient O-ring seal 22 is received within confronting grooves in the top cover plate 4 and the upper face of the member 8, and functions to render watertight the joint between said cover plate and the housing.

The cover plate 4 is detachably secured in position by a plurality of circumferentially spaced, L-shaped latches 24, each of which is pivoted at its lower end 26 to the exterior wall of cylindrical member 8. The cover plate 4 has notches 28 therein in registry with each of the latches 24, and a detent 30 is disposed on said plate radially inwardly of each notch in position to be engaged by the resilient end 32 of its associated latch. Thus, said cover plate 4 is easily attached and removed to provide access to the interior of the camera, and the joint between it and the housing 2 is made watertight by the seal 22.

The bottom cover plate 6 has a raised portion 34 thereon which telescopes within the lower end of the cylindrical member 10, and is secured in position by a plurality of latch assemblies 36 which are identical in construction to those utilized for securing the top cover plate 4. An annular, resilient O-ring seal 38 is disposed between the bottom plate 6 and member 10, and functions to seal the joint therebetween.

The lower cylindrical member 10 has a transverse web 40 extending thereacross, which web has a central bore 42 extending immediately surrounding the bore 42, and a second, larger in diameter annular recess 46 surrounding the recess 44. A cylindrical boss 48 extends downwardly from the center of the top plate 4, and has therein a circular recess 50 positioned to confront and preferably of the same diameter as the relatively large annular recess 46.

Positioned within the housing 2 in alignment with the concentric lens element 16 is a lens barrel 52, said barrel having a circular boss 54 on its upper surface and a diametrically opposite, longer circular boss 56 on its lower surface; the bosses 54 and 56 are received within the recesses 50 and 46, respectively, suitable bearing elements 58, 60 and 62 being interposed therebetween. The lens barrel 52 has an inturned lip at its forward end, and contains a plurality of lens elements 64 and an aperture 66, all separated where necessary by spacers 68; the lens elements are secured in position in the usual manner, as by cementing or by interengaging threads between the spacers 68 and the inner wall of said lens barrel.

As is best shown in FIG. 2, the lens barrel 52 is fitted at its rear end with a rectangular in cross-section portion 70, the side walls 72 of which taper inwardly. The portion 70 terminates in a vertical end plate 74, which has centrally therein a very narrow, rectangular vertical slot 76. The slot 76 comprises the shutter for the camera, and typically measures about one degree in width by about 40 degrees in height.

The lens barrel 52 is mounted for rotation relative to the housing 2, and an integral shaft 78 extends from the lower boss 56 through the bore 42 and into the space defined between the cover plate 6 and the web 40. A gear 80 is secured to said shaft 78, and is driven by a gear 82 secured to the output shaft of a constant speed electric drive motor 84. The motor 84 is secured to the housing by suitable means, and is supplied with electricity from a battery source. Normally, for underwater use the motor 84 would be remotely controlled by a suitable switch arrangement; when activated, it functions to rotate the lens barrel 52 to thereby cause the camera to sweep over its intended field of vision.

While the lens barrel is shown to be driven by an electric motor arrangement, it is to be understood that a conventional camera spring driven motor and governor apparatus could be utilized instead. Further, while a constant speed motor is believed desirable in most instances, for certain applications it is understood that a variable speed motor apparatus might instead be utilized.

The film holding and transporting apparatus of the invention is best seen in FIGS. 1 and 2, and includes a sheet metal bracket 88 secured to the rear end of the lens barrel 52 and comprising top and bottom support plates 90 and 92 and a rear plate 94. The rear plate 94, as is best shown in FIG. 1, is spaced from the end plate 74 sufficiently to permit film to freely pass therebetween, and functions to prohibit light passing through the lens element 16 from impinging upon the back of the film while the latter is being transported across the rear of the lens barrel.

The top and bottom plates 90 and 92 of the bracket 88 have aligned holes therein for receiving the opposite reduced in diameter shaft ends of a pair of rollers 96 and 98, one of which is positioned on each side of the plate 74 to facilitate the movement of film thereover. A conventional film supply cannister 100 is mounted in aligned holes in the plates 90 and 92 on one end of the bracket 88, and a take-up cannister 102 is similarly mounted at the opposite end of said bracket; film 104 (not shown in FIG. 1 for purposes of clarity), which in the illustrated embodiment of the invention is made like the conventional photographic film, may thus travel from the supply cannister 100 to the take-up cannister 102 across the plate 74 and in front of the shutter slit 70.

Mounted vertically between the plates 90 and 92 and disposed between the roller 98 and the take-up cannister 102 is a sprocket 105 having projecting teeth 106 and 108 thereon, said teeth being positioned to register with the rectangular openings 110 and 112, respectively, which are conventionally disposed in rows along the top and bottom edges of the film 104. The sprocket 105 has a gear 114 integral therewith at its lower end, which gear projects below plate 92 and engages with an identical in diameter idler gear 116. The idler gear 116 is rotatably mounted on the under surface of plate 92, and engages with an annular disk gear 118 which is itself secured to a boss 120 on the web 40 by screws 122; the disk gear 118 has a central opening therein through which the cylindrical boss 56 projects.

From an examination of FIGS. 1-3 it is readily seen that as the lens barrel rotates in the direction of the arrow 124 the sprocket 105 will be driven by the movement of the idler gear 116 on the stationary gear 118 in a direction opposite to said arrow; thus, the film 104, which is engaged and driven by the teeth 106 and 108, will be moved relatively past slit 76 in a direction opposite to that in which the plate 74 containing said slit is moved and at a slightly slower rate to compensate for the eccentricity of the rear nodal point. Further, if the gears 114 and 116 and the sprocket 105 are properly dimensioned, the film 104 will be transported at a rate identical to the rate of movement of the image in the slit 76 relative to the end plate 74; the resultant of this arrangement is that the film 104 will in effect stand still relative to the image. It is thus seen that the film transporting arrangement of the invention establishes a precise relationship between the film 104 and the shutter slit 76, whereby the data recorded on the film may be correlated with a high degree of precision to the position of the objects being photographed.

The take-up cannister 102 shown in the drawings consists of no more than a container, with the sprocket 105 serving as the sole element advancing the film. However, it is contemplated that said cannister may contain a driven take-up spool, which spool would materially assist in proper film movement and would nearly eliminate possible damage to the film which may result if the sprocket teeth 106 and 108 are the sole driving power.

When a take-up spool is employed in the cannister 102 it may be driven from the fixed gear 118 by an idler gear arrangement nearly identical to that utilized to drive the sprocket 105, save that the gears would preferably be proportioned to drive said spool at a rate slightly greater than the rate of the sprocket 105. This slightly faster rate would insure that the film would be under tension at all times, and a slip clutch arrangement would be inserted into said spool gear drive to prevent film breakage that otherwise would result from different speeds for the take-up spool and the sprocket.

Referring to FIG. 3, the lens system and film transporting apparatus of the camera are illustrated in diagrammatic form. An object is indicated at A, and the image thereof is indicated in the focal plane of the system. The front and rear nodal points of the system are indicated at $N_1$ and $N_2$, respectively, and the distance D represents the object distance measured along the principal axis A–a of the system between the object A and the front nodal point $N_1$; similarly, the distance between the image a and the rear nodal point $N_2$ denotes the image distance, and is indicated at d.

When the nodal points $N_1$ and $N_2$ and the points a and A all lie on a common axis, such as the principal axis A–a in FIG. 3, an image formed by light rays passing from A to a along said axis will be substantially distortion free. If, however, the lens barrel (and hence, because the element 16 is annular, the lens system) is rotated about a vertical axis passing therethrough the nodal points will no longer be aligned with the object A and the image a.

The manner for determining the proper position for the axis of rotation for lens system of the present invention is illustrated by the diagram of FIG. 4, where A, a, D and d are as defined with respect to FIG. 3. $N_{1_0}$ in FIG. 4 is the original, unrevolved position for the front nodal point $N_1$ in FIG. 3, and $N_{1_R}$ is the position for said front nodal point when it has been revolved about an axis 126 (FIGS. 1 and 2) passing through point C; similarly, $N_{2_0}$ and $N_{2_R}$ are the original and revolved positions for the rear nodal point $N_2$. $E_1$ and $E_2$ respectively represent the eccentric distances measured between the axis of rotation C and the front and rear nodal points.

A study of FIG. 4 will readily reveal that the triangle $CN_{1_R}A$ is similar to the triangle $CN_{2_R}a$, since it is known that object light ray $AN_{1_R}$ must be parallel to image light ray $N_{2_R}a$. Thus it can be stated that:

$$\frac{E_1}{E_2} = \frac{E_1 + D}{E_2 + d} \quad (1)$$

or $$E_1 E_2 + E_1 d = E_1 E_2 + E_2 D \quad (2)$$

Cancelling the common $E_1 E_2$ factor from both sides of Equation 2, it is seen that:

$$E_1 d = E_2 D \quad (3)$$

or, by rearranging:

$$\frac{E_1}{E_2} = \frac{D}{d} \quad (4)$$

Equation 4 simply means that if the axis of rotation C is positioned so that the ratio of the eccentricities of the front and rear nodal points is made equal to the ratio of the object distance (the distance measured along the principal axis from the front nodal point to the object) to the image distance (the distance measured along the principal axis from the rear nodal point to the image), no image movement will occur during lens rotation for objects at a distance D.

Since image movement will occur in the invention for object distances other than D, the following formula is given to determine the magnitude of the image movement for an object at a distance $D_1$ in FIG. 4:

$$c_1 = E_2 \theta \left( 1 - \frac{D}{D_1} \right) \quad (5)$$

where:

$c_1$ = the image movement in the focal plane at object distance $D_1$;
$\theta$ = the width in radians of slit 76;
$E_2$ = the rear nodal point eccentric distance from C;
$D$ = the object distance of no image movement; and
$D_1$ = the object distance measured on the principal axis A–a from $N_{1_0}$ to $A_1$ for image movement $C_1$.

Assuming for purposes of illustration that in Equation 5:

$\theta = 1$ degree, or 0.0175 radians;
$E_2 = 1$ millimeter;
$D = 200$ millimeters (or approximately 6½ feet); and
$D_1 = 3000$ millimeters (or approximately 10 feet);

then it can be calculated that $c_1 = 0.006$ millimeter. If an object distance $D_2$, measured from point $A_2$, of 1500 millimeters (or about 5 feet) is employed in Equation 5, and $\theta = 1$ degree and $E_2 = 1$ millimeter, the image movement $c_2$ for such a distance is found to also be 0.006 millimeter. Thus, the image movement does not exceed 0.006 mm. at object distances from 5 feet to 10 feet (a typical image movement depth of field) for the given conditions of a lens having a fixed-focus distance of 6½ feet, a width of 1 degree for slit 76, and a rear nodal point eccentricity of 1 mm.

It should be noted that the distances $$\frac{c_1}{2}$$

and $$\frac{c_2}{2}$$

in FIG. 4 are measured from the axis a–A with the lens positioned as shown. When the lens is rotated about axis 126 the image will move from one side of the axis a–C to the other side thereof, so that the actual image movement during rotation of the lens for an object positioned at $A_1$ or $A_2$ will be equal to $c_1$ or $c_2$, respectively.

It can also be readily demonstrated that for a fixed-focus lens system constructed according to the invention the difference in focus between the center of the slit and the edge of the slit owing to the cylindrical focal surface which the film 104 may present is negligible.

It is thus seen that if the axis of rotation 126 of the present fixed-focus camera is positioned accordingly to Equation 4, then the eccentricities of the front and rear nodal points will cause no significant image movement during lens system rotation. The present invention therefore provides a panoramic or wide field of vision, camera capable of providing unsmeared and dimensionally accurate photographic records. Moreover, the film holding and transporting apparatus insure easy correlation of the recorded to the real image, and the watertight construction of the camera coupled with its fixed focus lens system especially adapt it for underwater use.

Obviously, many modifications and variations of the present invention are possible in the light of the above teachings. It is therefore to be understood that within the scope of the appended claims the invention may be practiced otherwise than as specifically described.

I claim:

1. In a camera, a housing, an in-line lens system mounted within said housing for rotation about an axis, perpendicular to the axis of said lens system, said lens system having an object distance, an image distance, and spaced front and rear nodal points, said axis of rotation being so positioned that the ratio of the distance between said axis and said front nodal point to the distance between said axis and said rear nodal point is equal to the ratio of said object distance to said image distance.

2. In a camera, a housing, an arcuate lens element having concentric faces, said lens element being positioned in the side wall of said housing, a lens barrel mounted within said housing for rotation about an axis perpendicular to the axis of said barrel, the intersection of the axis of rotation with said barrel axis being at the center of concentricity of said concentric faces, said lens barrel being disposed to confront said concentric lens element, a plurality of lens elements mounted in said lens barrel, said plurality of lens elements and said arcuate lens element comprising a lens system having an object distance, an image distance, and spaced front and rear nodal points, said axis of rotation being so positioned that the ratio of the distance between said axis of rotation and said front nodal point to the distance between said axis of rotation and said rear nodal point is equal to the ratio of said object distance to said image distance.

3. The combination as recited in claim 2, wherein said concentric lens element has a 360 degree extent, and said lens barrel is arranged to rotate through the entire circumferential extent of said concentric lens element.

4. A camera, combination as defined in claim 2, film holder means having a film exposure slit attached to the rear end of said lens barrel and movable therewith, and film transporting means on said film holder means and arranged to cooperate with said housing for advancing the film held by said film holder means at a rate corresponding to the rate of image movement relative to said slit.

5. A camera as recited in claim 4, wherein said holder means includes means disposed on one side of said lens barrel for holding unexposed film, and a take-up means disposed on the other side of said barrel for storing exposed film.

6. A camera as recited in claim 5, wherein said film held by said holder means incorporates at least one row of spaced openings therein, and wherein said transporting means includes a cylindrical sprocket rotatably mounted to rotate with said lens barrel and having teeth therein positioned to engage said openings in said film, said sprocket being engageable with a fixed portion of said housing whereby upon rotation of said lens barrel relative to said housing said sprocket will rotate at a rate corresponding to the rate of rotation of said barrel to thereby advance said film.

7. A camera, comprising a housing, a lens element having concentric faces, said lens element being disposed in the side wall of said housing, a lens barrel mounted within said housing for rotation about an axis perpendicular to the axis of said barrel, the intersection of said axis of rotation and the barrel axis being at the center of concentricity of said concentric lens element, said lens barrel being disposed to confront said arcuate lens element and containing a plurality of in-line lens elements therein, said concentric lens element and said plurality of lens elements comprising an in-line lens system, film holder means attached to the rear end of said lens barrel and movable therewith, and film transporting means on said film holder means and arranged to cooperate with said housing for advancing film held by said film holder means at a rate of rotation of said lens barrel, said lens system being fixed in focus and having spaced front and rear nodal points, said axis of rotation being positioned along and perpendicular to the principal axis of said lens system according to the formula $$\frac{E_1}{E_2} = \frac{D}{d}$$

where:

$E_1$ = the distance measured between said axis of rotation and the front nodal point of said lens system;
$E_2$ = the distance measured between said axis of rotation and the rear nodal point of said lens system;
$D$ = the distance measured along the principal axis of said lens system between the object and the front nodal point; and
$d$ = the distance measured along the principal axis of said lens system between the image and the rear nodal points.

8. A camera as recited in claim 7, wherein said concentric lens element has a 360 degree circumferential extent, and wherein said lens barrel is arranged to rotate through the entire 360 degree extent of said concentric lens element.

9. A camera, comprising a housing, an annular lens element disposed in the side wall of said housing, a lens barrel mounted within said housing for rotation about an axis perpendicular both to said barrel and to a plane passing transversely through said annular lens element, said barrel being disposed to confront said annular lens element and containing a plurality of lens elements therein which together with said annular lens element comprise an in-line lens system, said lens barrel being closed at its rear end by a plate having a relatively narrow shutter slit therein positioned parallel to said axis of rotation, film holder means attached to the rear end of said lens barrel and movable therewith, and film transporting means on said film holder means and arranged to cooperate with said housing for advancing film held by said holder means, said lens system being fixed in focus and having spaced front and rear nodal points, said axis of rotation being positioned along and perpendicular to the principal axis of said lens system according to the formula $$\frac{E_1}{E_2} = \frac{D}{d}$$

where:

$E_1$ = the distance measured between said axis of rotation and the front nodal point of said lens system;
$E_2$ = the distance measured between said axis of rotation and the rear nodal point of said lens system;
$D$ = the distance measured along the principal axis of said lens system between the object and the front nodal point; and
$d$ = the distance measured along the principal axis of said lens system between the image and the rear nodal point.

10. A camera as recited in claim 9, wherein said holder means includes means disposed on one side of said lens barrel for holding unexposed film, and a take-up means disposed on the other side of said barrel for storing exposed film, said film being held incorporating at least one row of spaced openings therein, and wherein said transporting means includes a cylindrical sprocket rotatably mounted to rotate with said lens barrel and having teeth thereon positioned to engage said openings in said film, said sprocket being engageable with a fixed portion of said housing whereby upon rotation of said lens barrel relative to said housing said sprocket will rotate at a rate corresponding to the rate of rotation of said barrel to thereby advance said film.

11. A camera as recited in claim 10, including additionally an annular disk gear affixed to said housing perpendicular to and concentrically about said axis of rotation, a drive gear on one end of said sprocket, and an idler gear disposed between and in engagement with said disk gear and said drive gear, whereby said film is moved in a direction opposite to the movement of said rear end of said barrel upon rotation of the latter.

12. A camera as recited in claim 9, including additionally motor means disposed within said housing and arranged to rotate said barrel.

13. A camera as recited in claim 9, wherein said housing includes a cylindrical side wall, a top cover plate, a bottom cover plate, means detachably securing said plates in position, and seal means disposed between said plates and said cylinder to render said housing watertight.

References Cited in the file of this patent
UNITED STATES PATENTS

| | | |
|---|---|---|
| 369,165 | Connon | Aug. 30, 1887 |
| 683,573 | Pasquarelli | Oct. 1, 1901 |
| 867,396 | Muller | Oct. 1, 1907 |
| 3,059,528 | Allan | Oct. 23, 1962 |